United States Patent [19]
Clark et al.

[11] Patent Number: 5,463,936
[45] Date of Patent: Nov. 7, 1995

[54] COMBINED BREAD BAKER AND BUTTER CHURN

[75] Inventors: Robert H. Clark, Columbia; Joel J. Terrell, III, Boonville, both of Mo.

[73] Assignee: Toastmaster Inc., Columbia, Mo.

[21] Appl. No.: 376,934

[22] Filed: Jan. 23, 1995

[51] Int. Cl.⁶ .................................................. A47J 27/00
[52] U.S. Cl. ...................... 99/327; 99/331; 99/339; 99/348; 99/357; 99/453; 99/468; 366/98; 366/146; 366/314
[58] Field of Search .................... 99/325–327, 329 R, 99/331–333, 339, 340, 348, 357, 352, 484, 452–455, 468, 467; 366/144–146, 149, 69, 98, 205, 314, 343, 601; 426/504, 512; 62/342

[56] References Cited

U.S. PATENT DOCUMENTS

| | | | |
|---|---|---|---|
| 4,762,057 | 8/1988 | Hirota et al. ......................... | 366/98 |
| 4,836,683 | 6/1989 | Aoyama ................................ | 99/348 |
| 4,844,048 | 7/1989 | Aruga et al. ......................... | 99/348 |
| 4,951,559 | 8/1990 | Arao et al. ........................... | 99/468 |
| 4,957,040 | 9/1990 | Nakakura et al. .................... | 99/331 |
| 4,984,512 | 1/1991 | Takahashi et al. ................... | 99/327 |
| 5,054,383 | 10/1991 | Cho ...................................... | 99/339 |
| 5,076,153 | 12/1991 | Takahashi et al. ................... | 99/327 |
| 5,351,606 | 10/1994 | Matsuzaki ............................ | 99/348 |
| 5,363,746 | 11/1994 | Gordon ................................. | 99/328 |
| 5,386,763 | 2/1995 | Chen .................................... | 99/357 |
| 5,392,695 | 2/1995 | Junkel .................................. | 99/468 |

OTHER PUBLICATIONS

Toastmaster Bread Box Bread Maker Instruction Booklet, distributed by Toastmaster, Inc., 1994.

*Primary Examiner*—Timothy F. Simone
*Attorney, Agent, or Firm*—Kokjer, Kircher, Bowman & Johnson

[57] ABSTRACT

An apparatus is provided for serving the dual purposes of baking bread and for churning butter. The apparatus includes a processing chamber which releasably receives a pan which retains the ingredients to be processed. The pan includes a paddle which rotates to stir bread and to churn butter. The processing chamber further includes a heating element surrounding the pan which heats the pan during a bread baking operation. A power controller controls a motor which drives the stirring paddle and controls the heater during a bread baking operation. A switch is supplied between the power controller and the power supply to disconnect the power controller during a butter churning operation. The switch further connects the motor which drives the stirring paddle directly to the power source when the switch is set in a butter churning position.

7 Claims, 2 Drawing Sheets

COMBINED BREAD BAKER AND BUTTER CHURN

FIELD OF THE INVENTION

The present invention generally relates to an apparatus which functions alternately as a bread baker and as a butter churn with the selection therebetween being easily effected with a single switch.

BACKGROUND OF THE INVENTION

In the past, automatic bread baking machines have been proposed as household appliances. These machines include a bread pan removably received within a baking chamber. The chamber includes a heating element and a control circuit to control the complete bread baking process. The breadpan includes a paddle or kneading blade to stir the dough. Such conventional bread bakers allow the user to simply load the machine with the component ingredients of the bread to be baked (e.g., flour, water, salt, and yeast). Thereafter, the machine processes the ingredients through a plurality of conventionally known steps necessary to successfully bake the bread including mixing, raising, shaping, baking and cool down.

The control circuit includes a micro controller, connected in parallel with a power controller. The power controller is connected to an external power supply, such as an AC plug. The power controller further communicates with and controls operation of a kneading motor (which drivably rotates the kneading blade), the heating element (which heats the bread pan) and a blower motor (which drives an air circulation fan during the cooling operation). The power controller processes signals from a baking sensor during the baking operation and further communicates with a safety switch that turns the system off when unsafe operating conditions exist.

However, heretofore, a bread baker has never been proposed capable of serving the dual purposes of producing bread and butter.

It is an object of the present invention to overcome the disadvantages experienced heretofore.

SUMMARY OF THE INVENTION

It is an object of the present invention to provide a single device capable of baking bread and of churning butter.

It is a further object of the present invention to provide a simple switch assembly that may be added to a bread baking machine which renders the machine capable of producing butter.

The foregoing and additional objectives are achieved by providing an apparatus having a housing with a processing chamber and a control chamber. The processing chamber receives a pan which is utilized while baking bread and while churning butter. The processing chamber includes a drive mechanism centrally located therein proximate its base for drivably engaging a kneading blade within the processing pan. The drive mechanism is belt driven by a motor located within the control chamber. The motor is controlled by a microprocessor which is in turn controlled by the user via a control panel. A simple switch is provided for converting the apparatus between bread baking and butter churning operations.

BRIEF DESCRIPTION OF THE DRAWINGS

The objects and features of the invention noted above are explained in more detail with reference to the drawings, in which like reference numerals denote like elements, and in which:

FIG. 3 illustrates a schematic of a control system utilized in connection with the present invention.

DETAILED DESCRIPTION OF THE INVENTION

Figure 1:
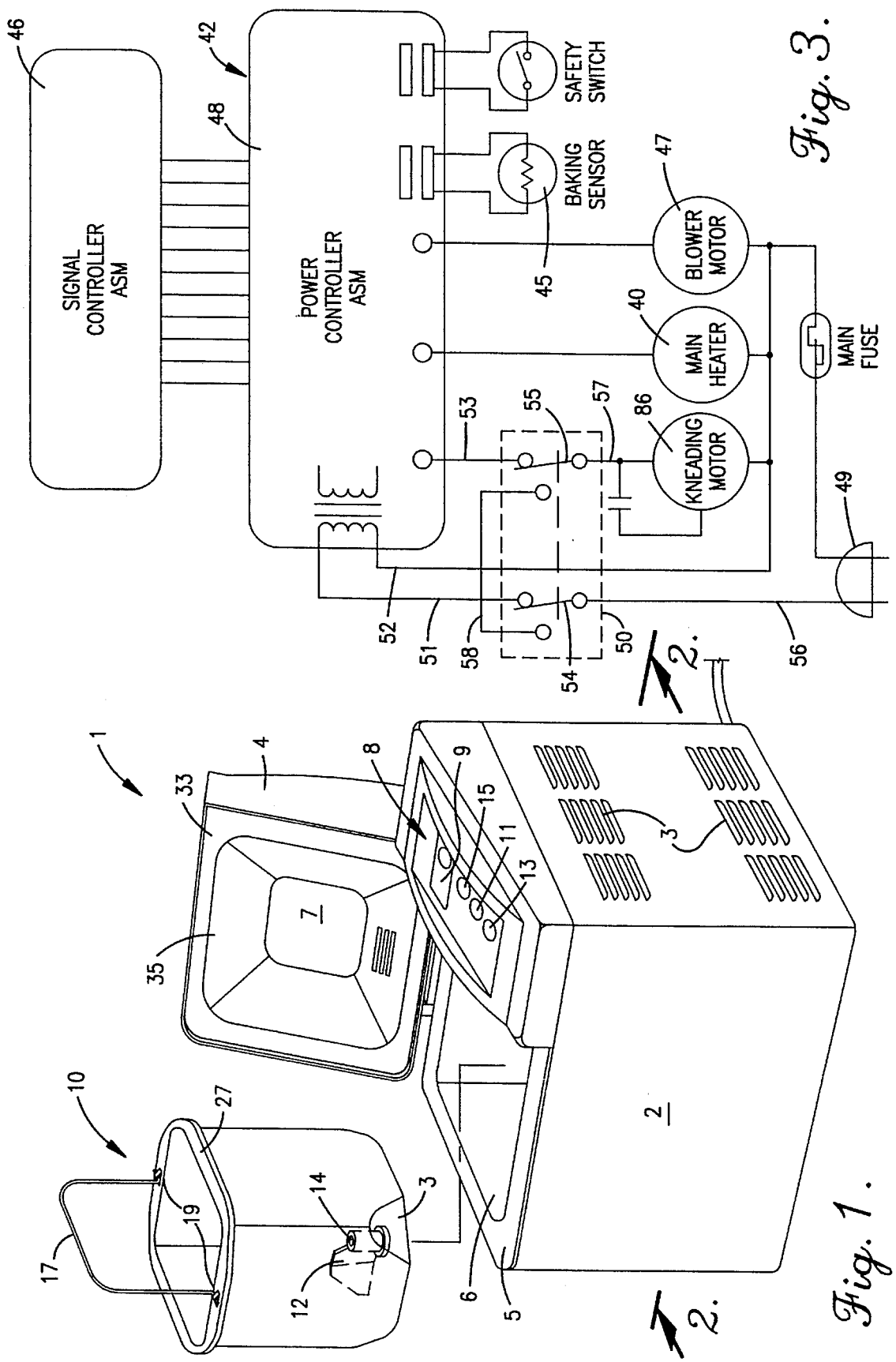
FIG. 1 illustrates a perspective view of an apparatus according to the present invention.

FIG. 1 generally illustrates a combined bread baker and butter churn according to the present invention (generally designated by the reference numeral 1). The apparatus includes a rectangular box shaped housing 2 having vents 3 along one side. The housing 2 includes an upper face 5 with a rectangular opening therein. The opening joins a processing chamber 6 for baking bread and churning butter. The chamber 6 is closed with a lid 4 hingeably mounted to the backside of the housing 2. The processing chamber 6 is located immediately adjacent a control panel 8 which affords the user a touch sensitive screen for controlling the apparatus.

The control panel 8 includes a display window 9 which indicates processing information such as the number of a current program being ran (different programs are provided for producing different types of bread and butter), the amount of time left to complete a current program, warnings and the like. Start and stop buttons 11 and 13 are also provided for beginning and ending a processing sequence. A selector button 15 allows the operator to select a particular program to be followed. These programs may include various processing sequences necessary to bake different types of bread or, alternatively, various processing sequences necessary to churn a desired type of butter. The processing chamber 6 detachably receives a rectangularly pan 10 having a handle 17.

The pan 4 is constructed with a flared ledge 27 about its upper edge. The handle 17 is hingeably mounted to opposite sides of the pan 10 at points 19 to allow the handle 17 to lie flat against the open upper edge of the pan 10 once inserted into the chamber 6 and with the lid 4 closed. The corners 3 within the pan 10 between the sides and bottom thereof are beveled to prevent square corners to afford easier removal of the pan's contents. A bottom end of the pan 10 includes a journalled opening there through which receives a support bearing not shown that rotatably supports a kneading mounting shaft 14. The mounting shaft 14 extends upward into the interior of the pan 10 and includes an upper portion having a flat side thereon. The shaft 14 is securely received within a corresponding recess in a bottom end of a kneading blade 12 which, when rotated, mixes and stirs the bread ingredients or cream to make butter.

The lid 4 is constructed in a rectangular shape having an outer periphery substantially conforming to the top 5 of the housing 2. The lid 4 includes a lower ledge 33 extending about its outer surface and aligned to sealably engage the top 5. The interior portion of the lid 4 includes a rectangular tapered recess 35 extending between the lower and upper surfaces. A glass window 7 is provided proximate the upper end of the rectangular tapered recess 35 to enable a user to view the product being processed.

Figure 2:
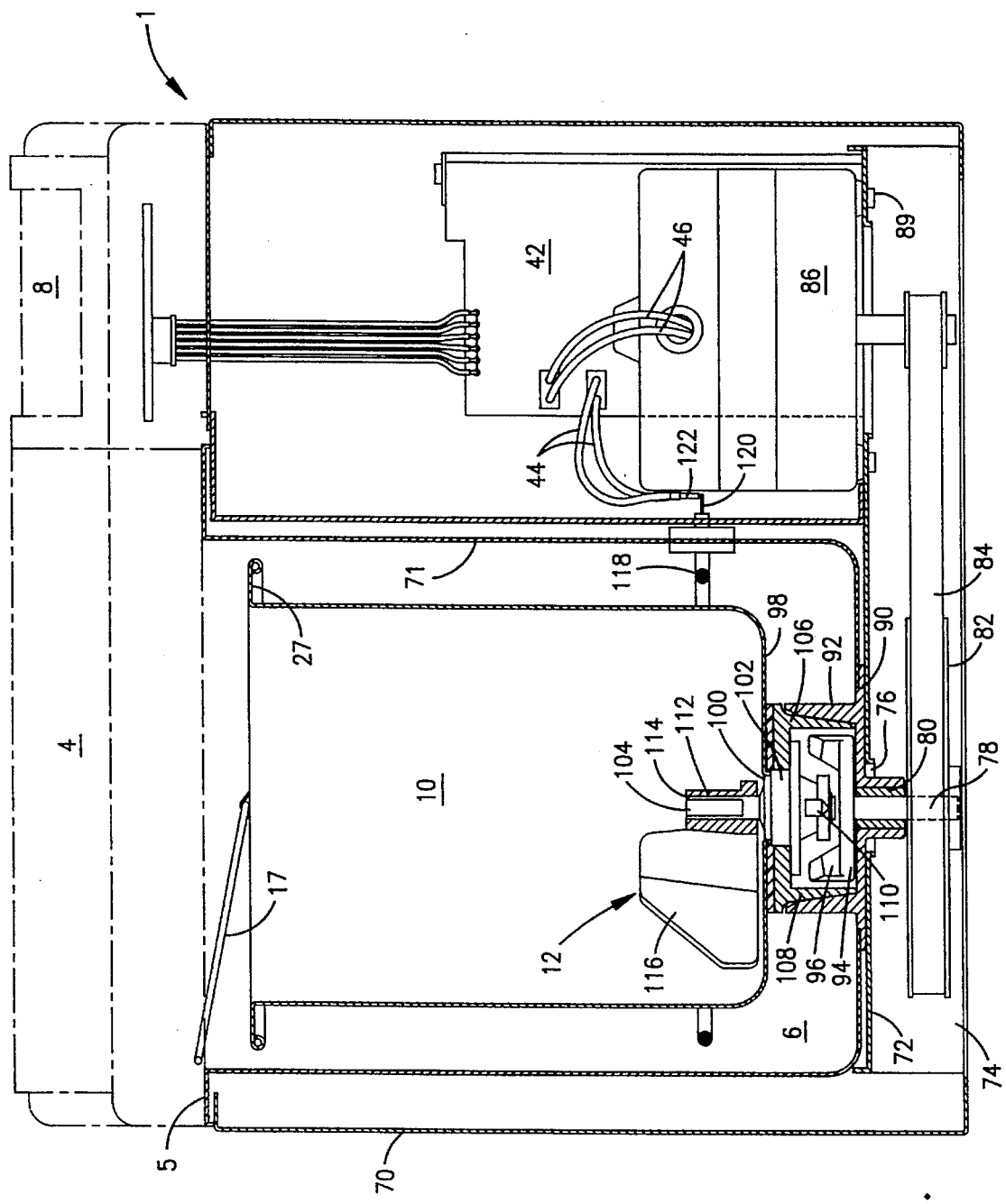
FIG. 2 illustrates a side sectional view of the present invention along line 2—2 in FIG. 1.

Turning to FIG. 2, the processing chamber 6 includes side walls 70 and 71 and a base 72. The processing chamber 6 receives the pan 10 with the lid 4 closed thereover. The base 72 separates the processing chamber 6 from a pulley receiving chamber 74. The base includes a hole 76 therethrough and located proximate its center to rotatably support a pulley shaft 78 mounted within a bearing 80. A pulley 82 is provided upon the lower end of the pulley shaft and is driven via a belt 84 by a motor 86. A drive pulley 88 is provided upon the drive shaft of the motor 86. The motor is supported in an inverted position via bolts 89 attached to the base 72.

Returning to the processing chamber 6, the base 72 fixedly receives a collar 90 on its upper surface and through the hole 76. The collar 90 is secured to the base via rivets and includes a tubular sleeve 92 projecting upward and providing a support for the pan 10. The collar 90 rotatably receives the shaft 78 through a hole in its center. The upper end of the shaft 78 is fixedly mounted to a drive plate 94 which rotates within the collar 90. The drive plate 94 includes drive fingers 96 extending upward therefrom and arranged diametrically opposed to one another across the central rotational axis of the pulley shaft 78. The drive fingers 96 are arranged radially inward from the sleeve 92 to afford an empty tubular passage against the interior of the sleeve 92.

The bread pan 10 includes a base 98 having a hole 100 through the center thereof which is journalled to support a rotary bearing 102. The bearing 102 rotatably receives a kneading shaft 104 therethrough which is aligned along a rotational axis common with that of the pulley shaft 78.

The pan base 98 includes a lower surface which is fixedly mounted to a second collar 106 having a sleeve 108 projecting downward therefrom and having an outer circumference slightly smaller than the inner circumference of the sleeve 92 of the collar 90. The sleeve 92 supportably receives the sleeve 108 therein during operation. The kneading shaft 104 extends downward through the bearing 102 and the base 98 of the pan 10 and includes a lower end which projects into the center region of the sleeve 108. The lower end of the kneading shaft 104 fixedly receives a cross bar 110 which includes transversely extending fingers aligned to engage the drive fingers 96.

The outer surface of the sleeve 108 includes ridges therealong extending along a length of the sleeve 108. The ridges are aligned with and correspond to longitudinally extending notches formed within the interior surface of the sleeve 92. When the pan 10 is inserted into the processing chamber 6, the ribs upon the sleeve 108 align with and engage the notches of the sleeve 92. This engaging relation prevents rotation between the sleeves 108 and 92.

The upper end of the kneading shaft 104 is received within a base portion 112 of the kneading blade 12. The base section 112 includes a hole 114 therethrough to receive the kneading shaft 104. The shaft 104 includes a flat side thereon which corresponds to a flat surface within the hole 114 to prevent relative movement between the shaft 104 and the blade 12. The blade 12 further includes a paddle section 116 integrally formed with the base 112 and extending radially outward therefrom. The paddle section 116 effects all stirring operations within the pan 10.

The processing chamber 6 further includes a heating element 118 formed of a bent rod wrapped about the contour of the pan. The heating element 118 maintains an interior peripheral contour corresponding to the outer contour of the pan 10 such that when the pan 10 is inserted, the element 118 securely engages the exterior walls thereof. The element 118 includes pigtails 120 which extend through the wall 71 of the processing chamber 6. The pigtails 120 are received within a heater 122 controlled by the processor 42 via a line 44. The processor 42 further controls operation of the motor 86 via a line 46.

During operation, once the pan 10 is inserted into the processing chamber 6, the sleeve 108 is inserted within the sleeve 92 until the collars 90 and 106 abut against the upper edges of the sleeves 92 and 110. When in this engaged position, the transverse fingers 110 engage the driving fingers 96. When the motor 86 rotates, the belt 84 drives the pulley 82, thereby causing shaft 78 to rotate. When the shaft 78 rotates, the drive plate 94 mounted to the upper end thereof similarly rotates, thereby causing the drive fingers 96 to rotate the transverse fingers 110.

As the transverse fingers 110 rotate, the kneading shaft 104 is driven, thereby causing the blade 12 to rotate and the paddle 116 to stir the contents of the pan 10.

As illustrated in FIG. 2, a control system 42 is located immediately below and in communication with the control panel 8. The control system 42 controls the kneading motor 38, the heating element 40 and a blower motor. The controller further communicates with a baking sensor and a safety switch (as illustrated schematically in FIG. 3).

As shown in FIG. 3, the control system 42 includes a signal controller 46 which communicates with a power controller 48 which controls the kneading motor 86, the heater 40 and the blower motor 47. The signal controller 46 communicates with the control panel 8 to receive commands from the operator and to display information to the operator. Based upon this communication, the power controller effects the necessary processing controls to perform a bread baking operation or a butter churning operation. The power controller receives power from a conventional power source such as via the AC power plug 49. A switching assembly 50 is provided within the lines 51–53 between the power controller 48, AC power plug 49 and kneading motor 86. The switching assembly 50 includes two switches 54 and 55 which are controlled to change states simultaneously. A first state corresponds to a bread baking operation while a second state corresponds to a butter churning operation. Referring to switch 54, when in a bread baking state, the switch 54 is set to transmit power from the input lead 56 to the output lead 51. Similarly, the switch 55, while in a bread baking state, is set to transmit power between input lead 53 and output lead 57. When in a butter churning state, switches 54 and 55 are alternated to bypass the power controller 48 by connecting the input lead 56 with the output lead 58. Switch 55 further connects lead 58 with the kneading motor input lead 57. In this manner, power is delivered from the AC plug 49 directly to the kneading motor 38, by passing the power controller 48 and maintaining the kneading motor 38 ON so long as the switches 54 and 55 remain in a state corresponding to a butter churning operation. While set in the butter churning state, the switching assembly 50 prevents power from being delivered to the heater 40, blower 47 and baking sensor 45.

When the operator desires to effect a bread baking operation, the switches 54 and 55 are set in the first state to deliver power from the AC plug 49 to the power controller 48. However, when the user desires to effect a butter churning operation, he/she changes the switches 54 and 55 states to deliver power directly to the kneading motor and bypass the power controller 48. The user maintains the switches 54 and 55 in a state corresponding to a butter churning operation until butter is produced within the pan 10. Thereafter, the user turns off the unit and removes the pan 10.

The switches 54 and 55 provide a simple mechanism for converting an apparatus dedicated to bread baking to an apparatus capable of churning butter by diverting power from the circuitry solely needed for bread baking operations and delivering power only to the kneading motor 86. During butter churning, the heating element remains off and the kneading motor turns the paddle 116 at a constant speed until butter is produced.

Optionally, the power controller 48 may be reprogrammed to add a program for performing a butter churning operation. In this alternative embodiment, the controller 48 will add the additional processing program to the existing list of bread baking programs. Thus, to effect a butter churning operation, the user simply presses the selector button 15 until the butter churning program is selected. Thereafter, the user continuously presses the start button 11.

When a butter churning program is selected, the controller 48, in this alternative embodiment, turns off the power to the main heater 40, blower motor 47 and baking sensor 45. Instead, the controller 48 simply provides power to the kneading motor 86 which drives the paddle 116. The controller may drive the motor 86 continuously until the operator presses the stop button 13. Alternatively, the controller 48 may be programmed to include a timer which turns the kneading motor 86 off, during a butter churning program, after a preestablished period of time necessary to produce butter. As a further alternative, a sensor may be included to sense the resistance encountered by the paddle 116, and thus by the motor 86. As cream turns to butter its consistency increases. Thus, the paddle experiences more resistance. As this resistance increases, the controller 48 identifies the resistance as the conversion of cream to butter. When the cream is completely converted to butter of a desires consistency, the paddle 116 will encounter a maximum desired resistance. When the paddle 116 reaches this maximum desired resistance, the controller 48 determines that butter has been produced having a desired consistency and thus the controller 48 turns the motor 86 off.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An apparatus for baking bread and for churning butter, comprising:
   a pan for receiving ingredients to be processed when making bread and when churning butter, said pan including a paddle therein for stirring the contents of the pan;
   a processing chamber for releasably receiving said pan, said processing chamber having drive means mounted upon the base thereof for drivably engaging said paddle;
   a motor for driving said drive means and said paddle;
   bread baking control means for making bread;
   a power supply for driving said bread baking control means and said motor; and
   a selector switch for disconnecting said bread baking control means and for simultaneously directly connecting said power supply to said motor.

2. An apparatus according to claim 1, further comprising:
   a heating element releasably engaging an exterior of said pan for heating said pan during a bread making process, said selector switch disengaging said heating element when directly connecting said power supply to said motor.

3. An apparatus according to claim 1, wherein said selector switch includes a bread baking state and a butter churning state, said switch connecting said control means to said power supply when in said bread baking position, and connecting said motor to said power supply when in said butter churning position.

4. An apparatus according to claim 1, wherein said control means comprises a power controller for turning said motor on and off during a bread baking operation.

5. An apparatus according to claim 1, said control means further comprising:
   a main heater for heating said pan when baking bread,
   a blower for circulating cool air about said pan during a cooling stage of said bread baking operation,
   a baking sensor for determining a state of a content of said pan, and
   a power controller for selectively turning on and off said kneading motor, main heater, blower and baking sensor.

6. An apparatus according to claim 1, said drive means further comprising:
   a collar mounted upon a base of said processing chamber and rotatably receiving said drive plate therein, and
   a second collar mounted upon a lower surface of a base of said pan and including an engaging finger therein mounted to said paddle to rotate within said collar, said engaging finger being driven by said drive plate when said pan and processing chamber collars are aligned in an engaged position.

7. An apparatus according to claim 1, wherein said control means includes a power controller having an output line connected to an input line of said motor, said selector switch receiving power input lines from said power source and including output lines to said power controller and said motor, said selector switch connecting said power input lines with said input line of said motor when in a butter churning position and connecting said power input lines with the input lines of said power controller when in a bread baking position.

\* \* \* \* \*